United States Patent [19]

Nobue

[11] Patent Number: 5,264,938
[45] Date of Patent: Nov. 23, 1993

[54] IMAGE SENSOR
[75] Inventor: Mamoru Nobue, Tochigi, Japan
[73] Assignee: Fuji Xerox Co., Ltd., Tokyo, Japan
[21] Appl. No.: 751,056
[22] Filed: Aug. 28, 1991
[30] Foreign Application Priority Data
  Oct. 18, 1990 [JP] Japan .................................. 2-277813
[51] Int. Cl.$^5$ ......................... H04N 5/335; H04N 3/14
[52] U.S. Cl. ........................... 358/213.15; 358/213.18; 358/213.31
[58] Field of Search ...................... 358/213.11, 213.13, 358/213.15, 213.17, 213.18, 213.22, 213.27, 213.26

[56] References Cited

U.S. PATENT DOCUMENTS

| | | | |
|---|---|---|---|
| 4,679,088 | 7/1987 | Chiyoma et al. | 358/213.18 |
| 4,763,197 | 8/1988 | Masuda | 358/213.16 |
| 4,953,028 | 8/1990 | Murayama et al. | 358/213.15 |
| 5,065,171 | 11/1991 | Miyake et al. | 346/154 |

Primary Examiner—Michael T. Razavi
Assistant Examiner—Joseph Colaianni
Attorney, Agent, or Firm—Finnegan, Henderson, Farabow, Garrett & Dunner

[57] ABSTRACT

An image sensor has blocks of light-receiving elements which are switched by respective associated thin-film transistors. Charges generated in the light-receiving elements are transferred to respective common signal lines through a matrix wiring on a block basis. Capacitor forming lines are formed above the common signal lines in a crossed relationship through an interposed insulating layer to provide a capacitance substantially equal to a source-gate overlap capacitance of each thin-film switching transistor. A voltage signal in an inverse phase relation to a gate control signal is applied to the capacitor forming lines to cancel out coupling of the gate control signal to the potential of the common signal lines.

4 Claims, 5 Drawing Sheets

IMAGE SENSOR

BACKGROUND OF THE INVENTION

The present invention relates to an image sensor for use in such apparatuses as a facsimile machine and a scanner. More particularly, in an image sensor of the type which detects signals by matrix-driving using switching elements connected to respective light-receiving elements, the invention is directed to the removal of interference of a switching element control voltage with signal detection lines.

Conventional facsimile machines and the like use a contact-type image sensor in which an image of, e.g., a document is projected onto the image sensor with one-to-one magnification and then converted into electric signals. Further, TFT (thin-film transistor)-driven image sensors have been proposed in which the projected image is detected while being divided into a multiplicity of pixels corresponding to light-receiving elements; charges generated in the light-receiving elements are transferred to wiring capacitances through switching elements formed of a TFT on a block-by-block basis and temporarily stored therein; and the stored charges are sequentially read out as electric signals by a driver IC at a rate of several hundreds of kilo-hertz to several mega-hertz. The matrix operation of the switching elements allows image information to be read out by a single driver IC, thus contributing to the reduction of the number of driver ICs for the image sensor.

FIG. 9 shows an example of a TFT-driven image sensor, and FIG. 10 shows an equivalent circuit for a single bit part of this image sensor. The image sensor includes: a light-receiving element array 101 in which a plurality of light-receiving elements $P_{1,1}-P_{k,n}$ are arranged in line over a length substantially the same as the width of a document; a charge transfer section 102 consisting of a plurality of switching elements $T_{1,1}-T_{k,n}$ which are associated with the respective light-receiving elements $P_{1,1}-P_{k,n}$; and a matrix-like multilayer wiring 103.

The light-receiving element array 101 is divided into k blocks, each block consisting of n light-receiving elements $P_{i,1}-P_{i,n}$. Each light-receiving element $P_{i,j}$ can be represented equivalently by a photodiode PD and a parasitic capacitance $C_p$. Each light-receiving element $P_{i,j}$ is connected to the drain electrode of the corresponding switching element $T_{i,j}$. The source electrode of each switching element $T_{i,j}$ is connected to a common signal line 104 (a total of n lines), which is commonly used for the k blocks, through the matrix-like multilayer wiring 103, and each common signal line 104 is connected to a driver IC 105. A TFT control circuit 106 is connected to the gate electrodes of the switching elements $T_{1,1}-T_{n,k}$ such that the switching elements are made conductive on a block basis.

A charge photoelectrically generated in each light-receiving element $P_{i,j}$ is stored in the parasitic capacitance $C_p$ of the light-receiving element and the drain-gate overlap capacitance $C_{GD}$ of the corresponding switching element $T_{i,j}$ for a certain period, and is thereafter re-distributed to the wiring capacitance $C_L$ of the multilayer wiring 103 and the common signal line 104 and the source-gate overlap capacitance $C_{GS}$ of the switching element $T_{i,j}$ on a block basis using the switching element $T_{i,j}$ as a switch for transferring the charge. For example, when a gate pulse $G_l$ sent via a control line $G_l$ from the TFT control circuit 106 turns on the switching elements $T_{l,1}-T_{l,n}$ of the first block, the charge generated in each light-receiving element $P_{l,j}$ of the first block is transferred to and stored in the corresponding wiring capacitance $C_L$. The charges stored in the wiring capacitances $C_L$ change the potentials of the common signal lines 104, and these potentials are sequentially output to corresponding output lines 107 by sequentially turning on analog switches $SW_j$ arranged in the driver IC 105. Then, by turning on the switching elements $T_{2,1}-T_{2,n}$ to $T_{k,1}-T_{k,n}$ of the second to kth blocks by gate pulses $\phi G_2$ to $\phi G_k$, respectively, the charges generated by the light-receiving elements $P_{2,1}-P_{2,n}$ to $P_{k,1}-P_{k,n}$ are transferred on a block basis.

That is, when the switching elements $T_{1,1}-T_{k,n}$ are on/off-controlled through the control lines $G_1-G_k$, the n switching elements of one block are simultaneously controlled, and the signals from the n light-receiving elements are introduced to the driver IC 105 in parallel. The potentials of the common signal lines 104 due to the transferred charges are sequentially read out, so that an image signal for a single line in the main scanning direction of a document can be obtained. The document is moved by a document feeding means (not shown) such as a roller while repeating the above operation, to thereby obtain an image signal of the entire document (refer to Japanese Patent Unexamined Publication No. Sho. 63-9358). Switches RS serve to remove a residual charge in the respective wiring capacitances $C_L$ (resetting).

In the image sensor as described above, the on/off control of the switching elements is performed by switching a voltage $V_G$, which is applied to the control line $G_i$ from the TFT control circuit 106, between two levels: high and low. Referring to FIG. 10, which shows an equivalent circuit for a single bit part of the image sensor, a change of the voltage $V_G$ affects the potential of the capacitance $C_L$ through the overlap capacitance $C_{GS}$ of the switching element T. That is, if the on/off potential difference of the voltage $V_G$ is expressed as $\Delta V_G$, the potential change in the wiring capacitance $C_L$ becomes $C_{GS}\Delta V_G/(C_L+C_{GS})$. If the wiring capacitance $C_L$ is sufficiently large, such a potential change is negligible. However, if the wiring capacitor $C_L$ is small, it has some appreciable effect. This potential change causes an increase of an offset potential of the common signal line 104, which results in the difficulties in dealing with the signals in the driver IC 105 and the subsequent stages.

SUMMARY OF THE INVENTION

The present invention has been made in view of the above circumstances. Accordingly, an object of the invention is to provide an image sensor which is capable of eliminating an influence of a change of a switching element control voltage on a signal line through capacitance coupling.

According to the invention, an image sensor comprises:

a light-receiving element array including a first plurality of blocks of light-receiving elements arranged in line, one block including a second plurality of light-receiving elements;

thin-film transistors for switching the respective light-receiving elements;

a control circuit for providing a control voltage to the thin-film transistors to turn on the thin-film transistors on a block basis;

the second plurality of common signal lines;

a matrix wiring provided between the thin-film transistors and the common signal lines, for transferring charges generated in the light-receiving elements to the respective common signal lines on a block basis;

a signal detecting circuit for sequentially detecting signals stored in the common signal lines in the form of the charges;

the second plurality of capacitors connected to the respective common signal lines; and a voltage supply for providing the capacitors with a canceling voltage having a phase reverse to that of the control voltage.

DESCRIPTION OF THE PREFERRED EMBODIMENTS

Embodiments of the invention will be described hereinafter with reference to the accompanying drawings.

Figure 1:
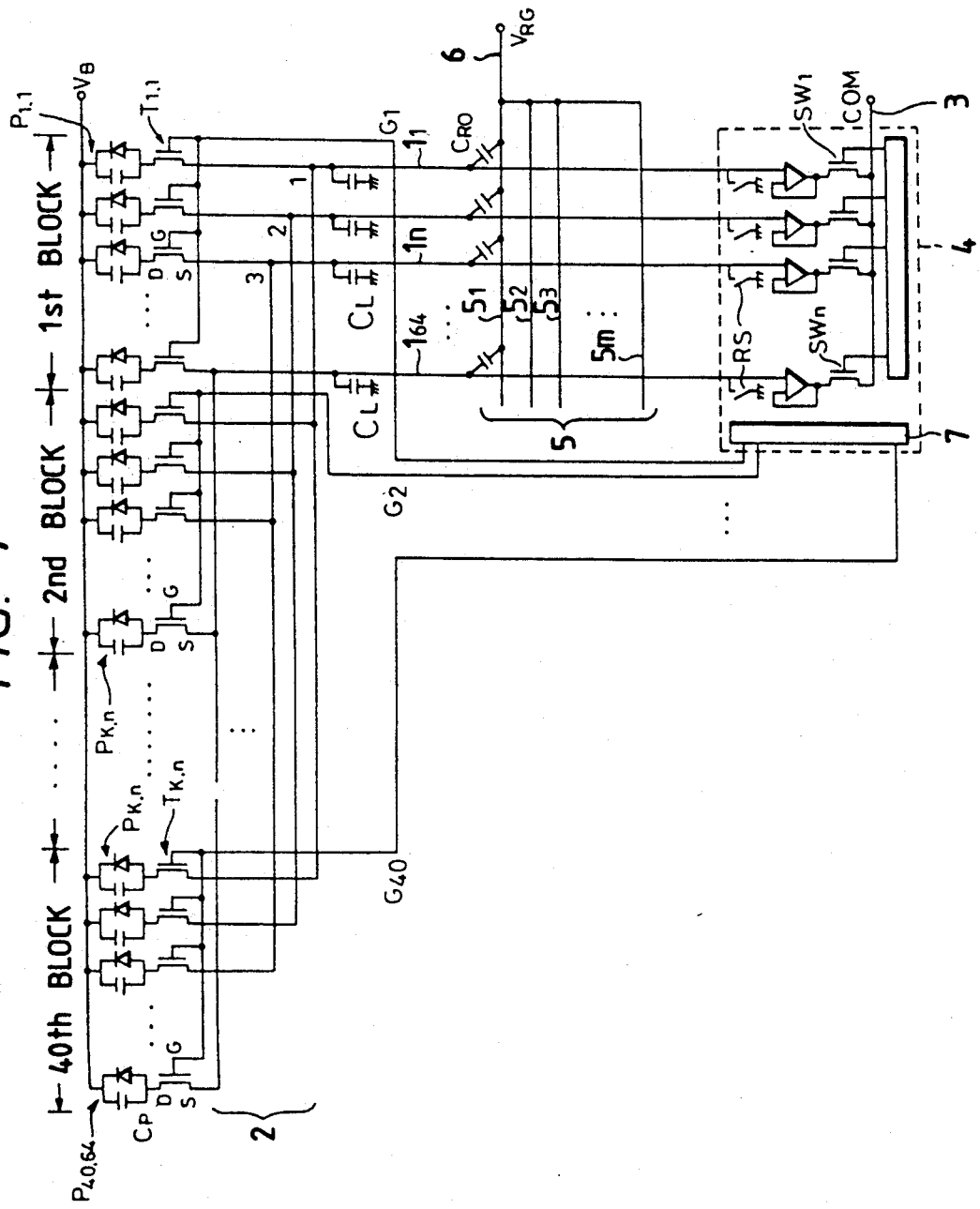
FIG. 1 is a circuit diagram of an image sensor according to an embodiment of the invention.

FIG. 1 shows an image sensor according to an embodiment of the invention. The image sensor includes: a light-receiving element array (light-receiving elements $P_{l,l}$-$P_{40,64}$) having 40 blocks of light-receiving elements, each block consisting of 64 light-receiving elements; switching elements $T_{k,n}$ (k=1 to 40, n=1 to 64) connected to the respective light-receiving elements $P_{k,n}$ (k=1 to 40, n=1 to 64) and serving as a charge transfer section; common signal lines $l_n$ (n=1 to 64); a multilayer wiring 2 for connecting the switching elements $T_{k,n}$ to the common signal lines $l_n$ in a matrix form; a driver IC 4 for sequentially outputting the potentials of the common signal lines $l_n$ to an output line 3 (COM); and a plurality (m) of capacitance forming lines 5 intersecting the common signal lines $l_n$ through an interposed insulating layer (not shown).

Each light-receiving element P has a thin-film-sandwiched structure in which a photoconductive member (e.g., amorphous silicon) is interposed between a metal electrode (e.g., Cr) and a transparent electrode (e.g., ITO).

Each switching element T has, similarly to the light-receiving element P, a thin-film lamination structure, and includes a gate electrode G, a source electrode S and a drain electrode D. The drain electrode D is connected to the corresponding light-receiving element P, while the source electrode S to the corresponding common signal line $l_n$. The gate electrodes G of one block of the switching elements $T_{k,1}$-$T_{k,64}$ are connected to corresponding one of the control lines $G_k$ (k=1 to 40). The switching elements $T_{k,n}$ are on/off-controlled by applying the voltages $V_G$ from a control circuit 7 on a block basis, so that charges generated in the 64 light-receiving elements $P_{k,1}$-$P_{k,64}$ are simultaneously transferred to the respective wiring capacitances $C_L$ of the multilayer wiring 2 and the common signal lines $l_n$.

Capacitor forming lines 5 are formed above the group of common signal lines $l_n$ through an interposed insulating layer. More specifically, the capacitor forming lines 5 are arranged in parallel with each other, and intersect the common signal lines $l_n$ at right angles. Therefore, each capacitor forming line 5 forms a capacitance $C_{RO}$ with one common signal line (e.g., common signal line $l_j$). Hence, the total coupling capacitance of the m capacitor forming lines 5 is $mC_{RO}$.

Only one ends of the capacitor forming lines 5 are connected to a voltage supply line 6. The voltage supply line 6 receives a voltage $V_{RG}$ which is in inverse phase relation to the control voltage $V_G$ applied to the control line $G_k$, to cancel out potential changes of the wiring capacitances $C_L$ which are due to the control voltage $V_G$ for the switching elements $T_{k,n}$.

Figure 5:
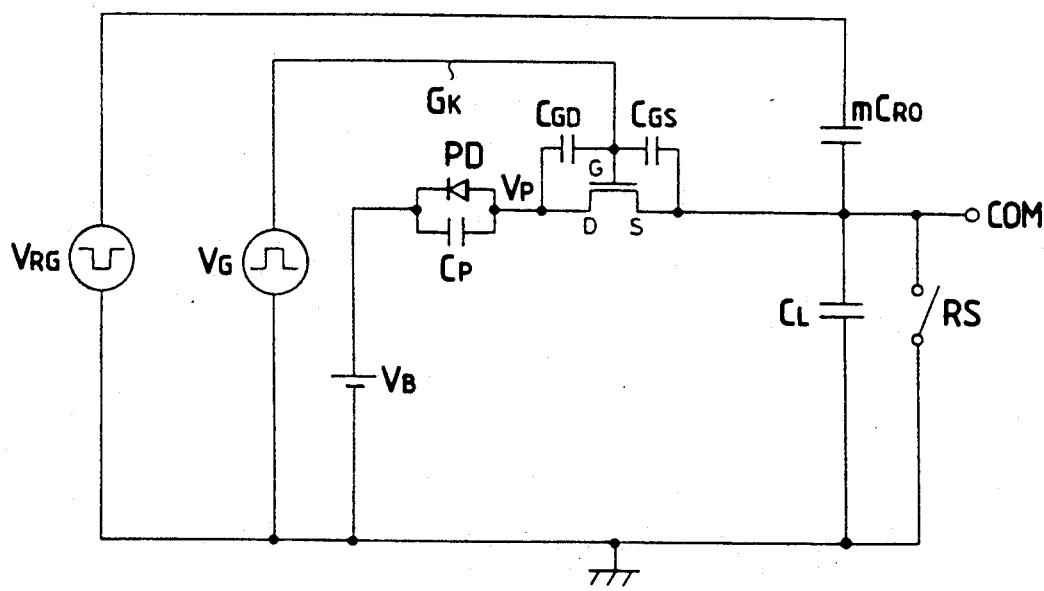
FIG. 5 is an equivalent circuit diagram for a single bit of the image sensor according to the embodiment.
Figure 10:
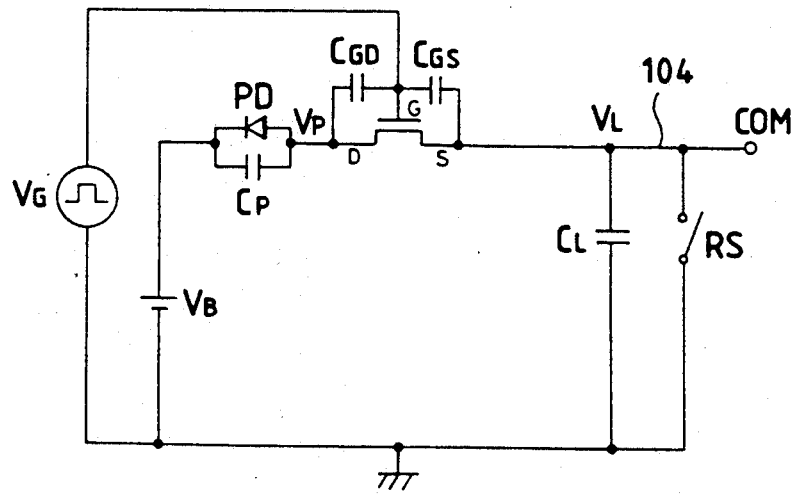
FIG. 10 is an equivalent circuit diagram for a single bit of the conventional image sensor.
Figure 9:
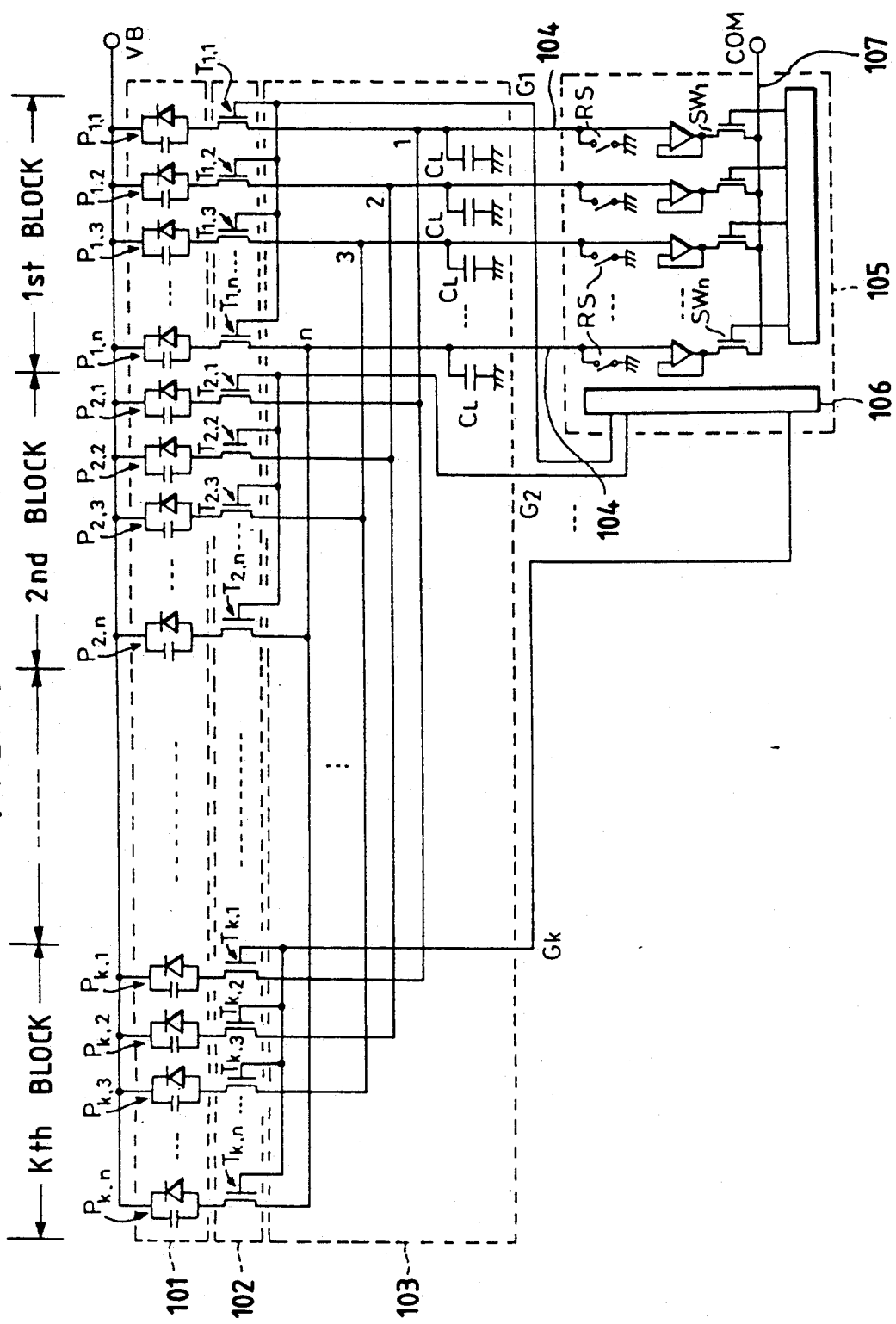
FIG. 9 is a circuit diagram showing a conventional image sensor.

FIG. 5 shows an equivalent circuit for a single bit part of the image sensor according to the embodiment. In FIG. 5, a capacitance $mC_{RO}$ and a voltage source $V_{RG}$ are added to the corresponding equivalent circuit of FIG. 10. Reference symbol $C_{GS}$ represents a source-gate overlap capacitance of each switching element T.

Assuming that the on/off potential difference of the control voltage $V_G$ for the switching elements T is $\Delta V_G$ and the on/off potential difference of the inverse-phase voltage $V_{RG}$ to be applied to the capacitor forming line 5 is $\Delta V_{RG}$, the following equation should be satisfied to eliminate the influence of the potential change of the control voltage $V_G$ on the line capacitor $C_L$:

$$C_{GS}|\Delta V_G|/(C_L+C_{GS}) \leq mC_{RO}|\Delta V_{RG}|/(C_L+mC_{RO}). \tag{1}$$

If $\Delta V_{RG}$ can be made variable, an inverse-phase voltage $V_{RG}$ having an on/off potential difference $\Delta V_{RG}$ which satisfies equation (1) may be applied to the voltage supply line 6.

On the other hand, if an inverse-phase voltage $V_{RG}$ having an absolute value equal to that of the control voltage $V_G$ is applied to the voltage supply line 6, the capacitance $C_{RO}$ and the number m of the capacitor forming lines 5 may be determined so as to satisfy the relationship: $C_{GS} = mC_{RO}$. In view of the fact that there occur some variations in the overlap capacitances $C_{GS}$ during the fabrication process of the image sensor, an excessive number of capacitor forming lines 5 may be formed and part of the capacitor forming lines 5 thus formed may be selected for use in accordance with actual values of the overlap capacitances $C_{GS}$.

Figure 2:
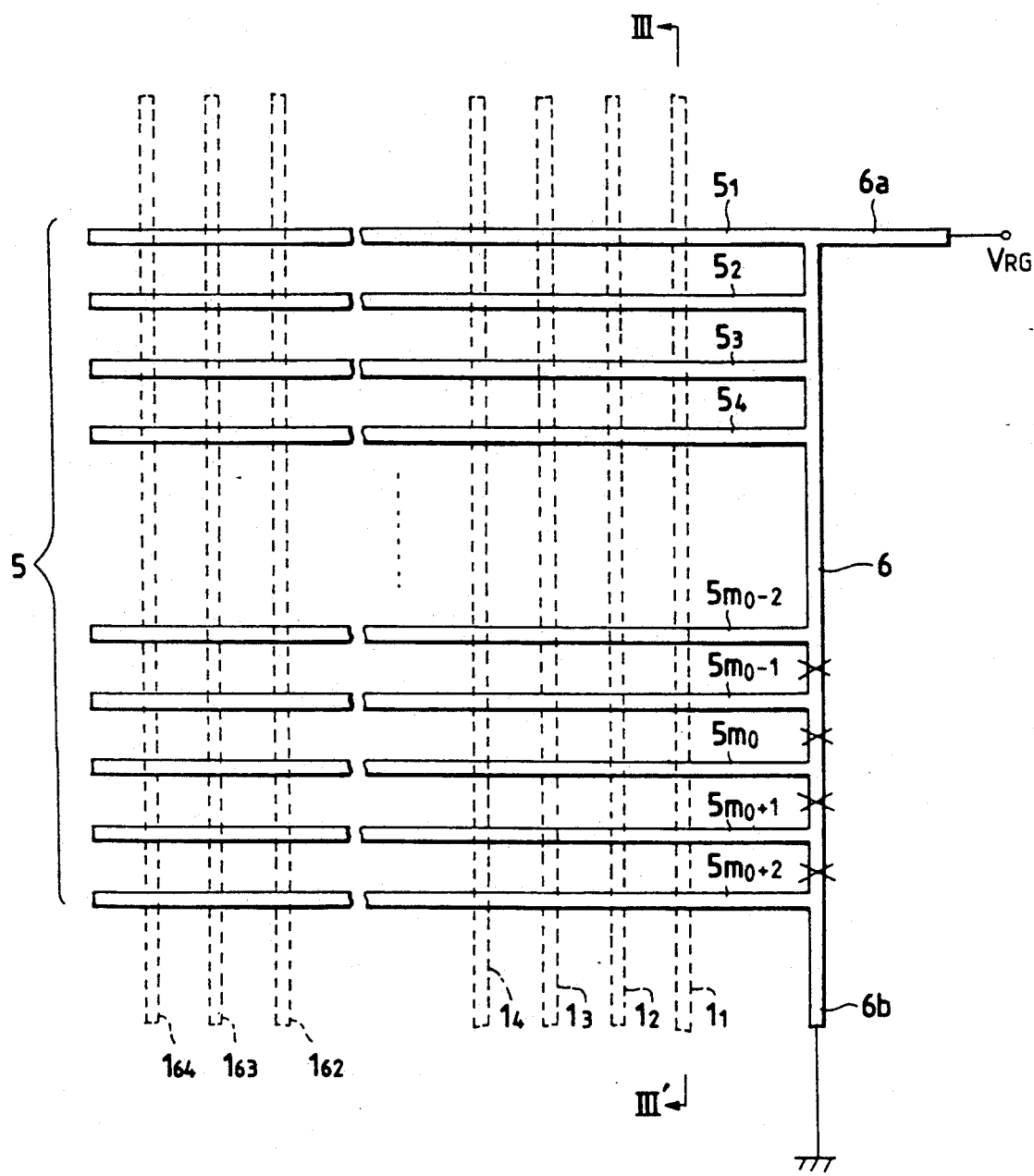
FIG. 2 is a plan view showing capacitor forming lines.
Figure 3:
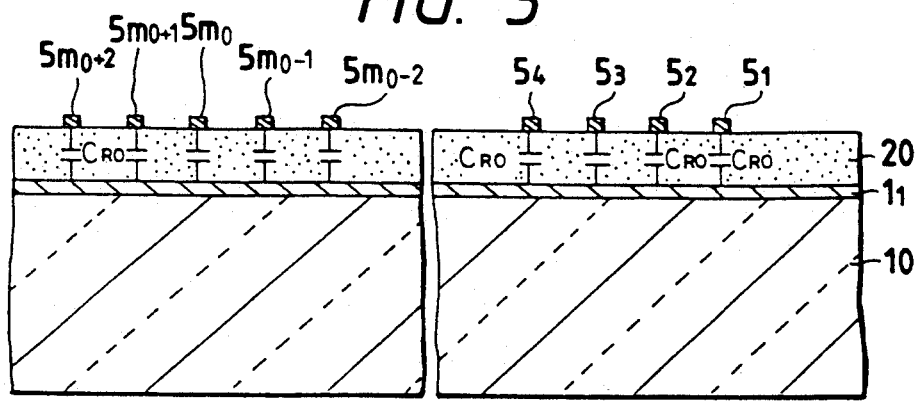
FIG. 3 is a sectional view taken along line III—III, in FIG. 2.

A specific construction of the capacitor forming lines 5 in the latter case where the inverse-phase voltage $V_{RG}$ having an absolute value equal to that of the control voltage $V_G$ is applied to the voltage supply line 6, will be described below with reference to FIGS. 2 and 3.

Common signal lines $l_n$ are formed on a glass substrate 10. $(m_o+2)$ lines of capacitor forming lines 5 are formed above the common signal lines $l_n$ through an insulating layer 20 which is made of, e.g., a silicon nitride (SiN$_x$) film. (Here, m$_o$ is a design center value.) These capacitor forming lines are made of metal such as chromium (Cr). Each capacitor forming line 5 forms a capacitance C$_{RO}$ with one common signal line $l_n$. One end of each capacitor forming line 5 is connected to the voltage supply line 6. This voltage supply line 6 is formed simultaneously with the capacitor forming lines 5 by patterning a layer of metal such as Cr. An extension 6a of the voltage supply line 6 is connected to an inverse-phase voltage pulse generator (not shown). One of the four portions (marked with "x" in FIG. 2) of the voltage supply line 6 which are interposed between the adjacent capacitor forming lines 5 is cut to select the number m to provide a proper total coupling capacitance mC$_{RO}$ in accordance with variations of the overlap capacitances C$_{GS}$.

For example, if the coupling capacitance C$_{RO}$ is approximately 1/20 of the overlap capacitance C$_{GS}$ of the switching element T, the number m can be controlled by trimming within the range of m=20±2, so that the coupling is eliminated with an accuracy of ±5% or less.

Further, the other extension 6b of the voltage supply line 6 is either grounded or set at a fixed potential to prevent the outermost one or ones (on the cutting side) of the capacitor forming lines 5 from being floated.

The fabrication process of the above-described image sensor will be described next with reference to FIGS. 2–4 and 6–8.

Figure 6:
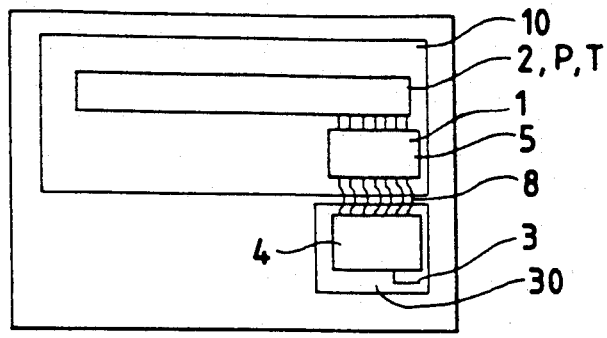
FIG. 6 is a plan view showing the general outlook of the image sensor according to the embodiment.

First, light-receiving elements P, TFT switching elements T, a multilayer wiring 2, and common signal lines $l_n$ (n=1 to 64) are formed on a glass substrate 10 by a thin-film process (FIG. 6).

An insulating layer 20 is formed on the common signal lines $l_n$ by depositing, e.g., a SiN$_x$ film, and metal such as Cr is further deposited thereon. Capacitor forming lines 5 and a voltage supply line 6 are formed by patterning the deposited metal (FIGS. 2 and 3).

A driver IC 4 (FIG. 6) mounted on a glass epoxy substrate 30 is arranged near the glass substrate 10, and ends of the common lines $l_n$ are connected to the respective bit parts of the driver IC 4 by bonding wires 8.

The image sensor is driven while a light-receiving element array consisting of 64×40 light-receiving elements P is irradiated by light. Then, the potential change (coupling) in each wiring capacitance C$_L$ is measured, the potential change being caused by the existence of the overlap capacitance C$_{GS}$ of the switching element T and the application of the control voltage V$_G$ for the switching element T.

The number m is determined from equation (1) based on the measurement results so that the potential change (coupling) is minimized, and an appropriate one of the four portions (marked with "x" in FIG. 2) of the voltage supply line 6 is cut by a YAG laser beam. The extension 6b of the voltage supply line 6 on the cutting side is either grounded or set at a fixed potential.

According to the above embodiment, an excessive number of capacitor forming lines 5 are formed, so that the number of capacitor forming lines 5 can be properly determined in accordance with the overlap capacitances C$_{GS}$ of the switching elements T. This allows the total capacitance of the capacitor forming lines 5 to be controlled, thereby canceling out the coupling accurately.

Since the unnecessary part of the capacitor forming lines 5 are either grounded or set at a fixed potential through the extension 6b of the voltage supply line 6, they are prevented from being floated, and therefore from affecting the common signal lines $l_n$.

Figure 4:
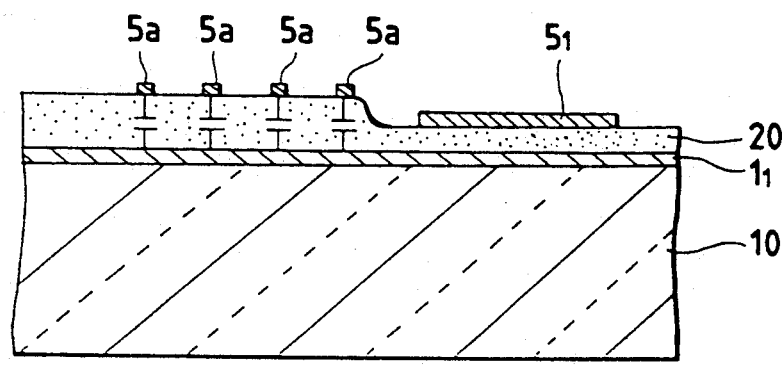
FIG. 4 is a sectional view showing another example of the capacitor forming lines.

Although, in the above embodiment, the coupling capacitances C$_{RO}$ provided by the respective capacitor forming lines 5 are made substantially equal to one another (though the respective coupling capacitances C$_{RO}$ slightly vary because they are formed by a thin-film process), there may be conceived another structure shown in FIG. 4 in which a single capacitor forming line 5$_l$ is formed to provide a large part of the necessary capacitance and several additional lines 5a for adjustment are also formed. The former large coupling capacitance may be provided by increasing the line area, or reducing the thickness of the insulating layer 20.

Figure 7:
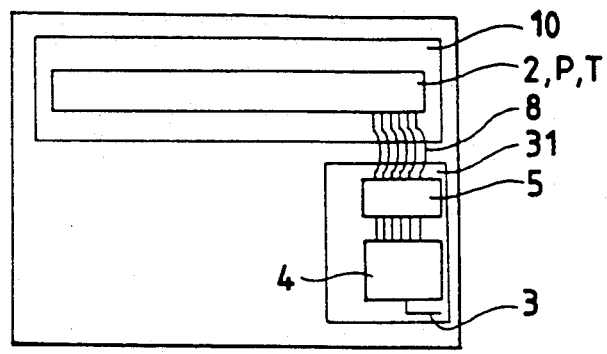
FIGS. 7 and 8 are plan views showing the general outlook of image sensors according to other embodiments.

Although, in the above embodiment, the capacitor forming lines 5 are formed on the same glass substrate 10 on which the light-receiving elements P and the switching elements T are formed, they may be formed, as shown in FIG. 7, on a substrate 31 on which the drive IC 4 is mounted. In such a case, the substrate 31 is made of glass and the capacitor forming lines 5 are formed in a thin-film structure as in the above embodiment. In FIG. 7, the parts and components which are the same as in FIG. 6 are designated by the same reference numerals.

Figure 8:
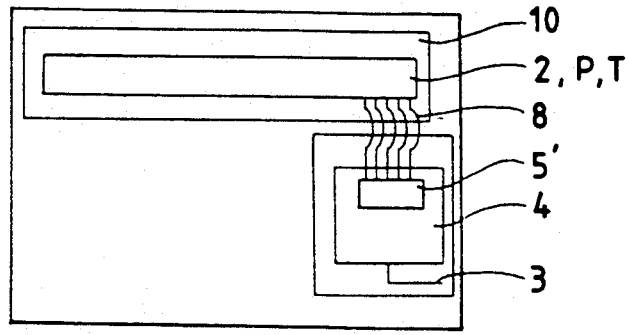

FIG. 8 shows another modification, in which instead of forming the capacitor forming lines 5 in a thin-film structure, capacitors 5' each connected in parallel with the corresponding source-gate overlap capacitance C$_{GS}$ of the switching element T, may be incorporated into the driver IC 4. In FIG. 8, the parts and components which are the same as in FIG. 6 are designated by the same reference numerals.

According to the invention, the capacitance mC$_{RO}$ is connected in parallel with the source-gate overlap capacitor C$_{GS}$ of the switching element T, and is supplied with the voltage V$_{RG}$ which is in an inverse phase relation to the control voltage V$_G$. Therefore, the coupling voltage, which is induced in the multilayer wiring and the common signal lines by the control voltage V$_G$, can be canceled out. Hence, an accurate image signal can be read out from the signal lines, and thus the S/N ratio property of the image sensor can be improved.

What is claimed is:

1. An image sensor comprising:
   a light-receiving element array including a first plurality of blocks of light-receiving elements arranged in line, each block including a second plurality of light-receiving elements;
   thin-film transistors for switching the respective light-receiving elements;
   a control circuit for providing a control voltage to the thin-film transistors to turn on the thin-film transistors on a block basis:
   respective common signal lines for receiving charge from the respective light receiving elements in each block of light-receiving elements;
   matrix wiring means for connecting the thin-film transistors and the common signal lines, for transferring charges generated in the light-receiving elements to the respective common signal lines on a block basis;
   a signal detecting circuit for sequentially detecting signals stored in the common signal lines in the form of the charges;
   respective capacitance means coupled to the respective common signal lines to offset control voltage error effects applied through the source-gate capacitance of the thin-film transistors; and a voltage supply providing the capacitance means with a voltage having a phase reverse to that of the control voltage to cancel the control voltage error effects.

2. The image sensor according to claim 1, wherein the capacitance means are formed by a third plurality of lines that intersect the common signal lines through an insulating layer interposed therebetween.

3. The image sensor according to claim 1, wherein each of the capacitance means has a capacitance substantially equal to a source-gate capacitance of a corresponding one of the thin-film transistors.

4. The image sensor according to claim 1, wherein the voltage supply can vary an on/off potential difference of the reverse-phase voltage.

* * * * *